(12) United States Patent
Kawamura et al.

(10) Patent No.: US 10,756,588 B2
(45) Date of Patent: Aug. 25, 2020

(54) STATOR FOR ROTARY ELECTRIC MACHINE

(71) Applicant: Mitsubishi Electric Corporation, Chiyoda-ku, Tokyo (JP)

(72) Inventors: Koji Kawamura, Tokyo (JP); Naohiro Motoishi, Tokyo (JP); Takatoshi Masuda, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 74 days.

(21) Appl. No.: 16/308,743

(22) PCT Filed: Jun. 5, 2017

(86) PCT No.: PCT/JP2017/020814
§ 371 (c)(1),
(2) Date: Dec. 10, 2018

(87) PCT Pub. No.: WO2017/217271
PCT Pub. Date: Dec. 21, 2017

(65) Prior Publication Data
US 2019/0260251 A1 Aug. 22, 2019

(30) Foreign Application Priority Data

Jun. 16, 2016 (JP) .................................. 2016-119449

(51) Int. Cl.
*H02K 3/12* (2006.01)
*H02K 3/28* (2006.01)
(Continued)

(52) U.S. Cl.
CPC ................. *H02K 3/12* (2013.01); *H02K 3/04* (2013.01); *H02K 3/28* (2013.01); *H02K 3/38* (2013.01)

(58) Field of Classification Search
CPC .. H02K 3/12; H02K 3/04; H02K 3/28; H02K 3/38
(Continued)

(56) References Cited

U.S. PATENT DOCUMENTS

2008/0303370 A1* 12/2008 Rahman ................ H02K 29/03
310/179
2016/0156238 A1 6/2016 Tsuiki et al.
2017/0054339 A1* 2/2017 Harakawa .............. H02K 1/146

FOREIGN PATENT DOCUMENTS

WO 2015029579 A1 3/2015

OTHER PUBLICATIONS

International Search Report (PCT/ISA/210) dated Aug. 15, 2017, by the Japan Patent Office as the International Searching Authority for International Application No. PCT/JP2017/020814.
(Continued)

*Primary Examiner* — Terrance L Kenerly
(74) *Attorney, Agent, or Firm* — Buchanan Ingersoll & Rooney PC

(57) ABSTRACT

A stator coil is formed by: combining a first division coil which is a coil with two or more turns and disposed in slots and in which a first terminal end portion and a second terminal end portion are formed, a second division coil which is a coil with a number of winding turns decreased from that of the first division coil by 0.5 turns and disposed in the slots and in which a first terminal end portion is formed, and a joint coil which is a coil with one turn and disposed in the slots and in which a first terminal end portion and a second terminal end portion are formed so as to be extended to the outside; and selectively joining the terminal end portions of these coils.

4 Claims, 12 Drawing Sheets

(51) Int. Cl.
*H02K 3/38* (2006.01)
*H02K 3/04* (2006.01)

(58) Field of Classification Search
USPC .......................................................... 310/187
See application file for complete search history.

(56) References Cited

OTHER PUBLICATIONS

Written Opinion (PCT/ISA/237) dated Aug. 15, 2017, by the Japan Patent Office as the International Searching Authority for International Application No. PCT/JP2017/020814.

* cited by examiner

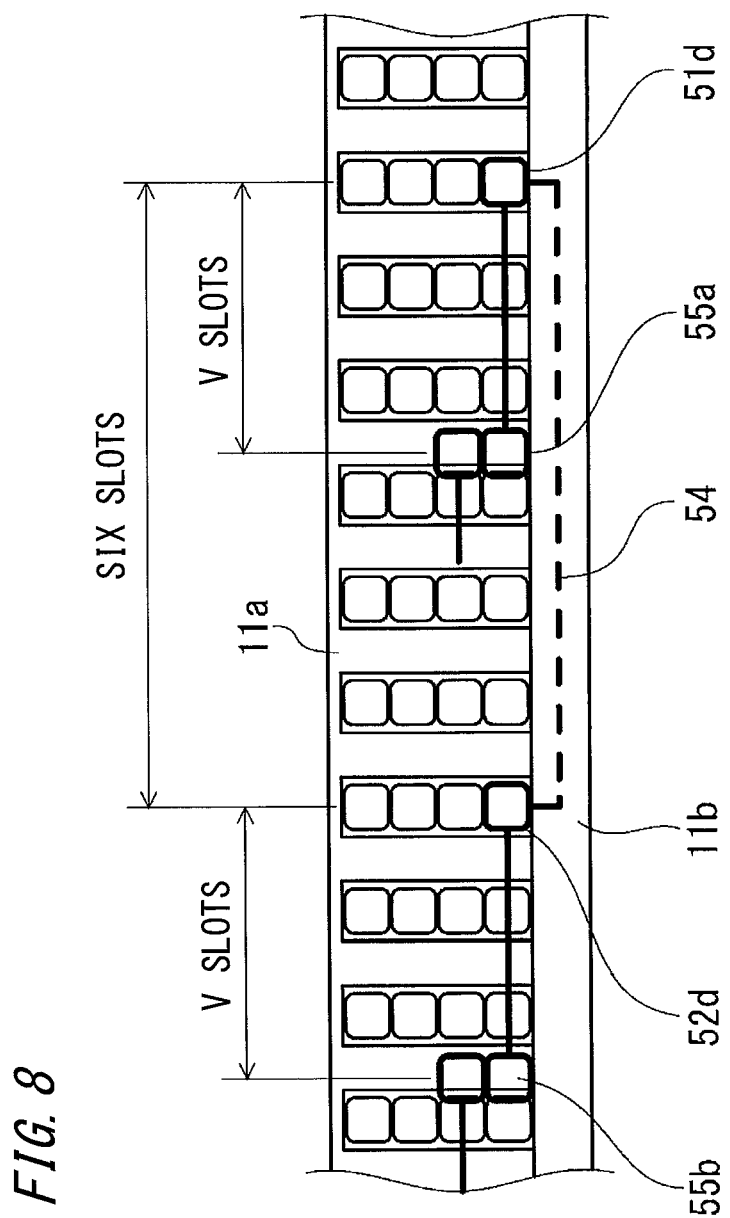

STATOR FOR ROTARY ELECTRIC MACHINE

TECHNICAL FIELD

The present invention relates to a stator for a rotary electric machine that allows the size of a product to be reduced by decreasing the height in an axial direction of a coil end portion while ensuring an insulation distance between the coil end portion and a motor frame.

BACKGROUND ART

Methods for winding a stator coil for a rotary electric machine include a concentrated winding method in which a coil is wound on each magnetic pole in a concentrated manner and a distributed winding method in which winding is performed over a plurality of magnetic poles. With the distributed winding method, the distribution of a rotation magnetic field becomes smooth as compared to that with the concentrated winding method. Thus, the distributed winding method has a merit in which vibration during operation of the rotary electric machine can be reduced.

Meanwhile, at a coil end portion of a stator coil wound by the distributed winding method, a plurality of wires overlap each other, and thus the height of the coil end portion is increased in the axial direction, which hinders size reduction of a rotary electric machine.

Therefore, there is the following winding method as one means for optimizing the manner in which the wires overlap each other at the coil end portion in the distributed winding method and minimizing the gaps between the wires overlapping each other, thereby reducing the height of the coil end portion. In this winding method, each stator coil for one phase is initially divided into a plurality of coils, and these division coils are assembled to a stator core and then joined together.

In other words, in this winding method, a portion of each division coil that is to be a coil end portion is formed in advance into such a shape as to minimize gaps when a plurality of coils overlap each other, and these division coils are assembled to the core, whereby waste gaps in the coil end portion are reduced and the height of the coil end portion is reduced.

In this case, assembling in an optimum shape is made possible by division into a plurality of coils, although assembling to the core is very difficult if an integrated coil is formed with an optimum coil end shape without being divided.

When this method is adopted, a stator coil is formed by joining the division coils together after the division coils are assembled. At this time, when the height of a joint portion is large, the height of a coil end also becomes large accordingly, so that there is a problem that the length in the axial direction of a rotary electric machine is increased.

As a countermeasure for this, in the conventional art, a configuration has been proposed in which joint portions of division coils are disposed at the radially inner side and the radially outer side of a coil end to expand the positions of the joint portions in the radial direction, thereby preventing an increase in height in the axial direction (see, for example, Patent Document 1 below).

CITATION LIST

Patent Document

Patent Document 1: International Publication No. WO2015/029579A1

SUMMARY OF THE INVENTION

Problems to be Solved by the Invention

In the conventional art disclosed in Patent Document 1 described above, an increase, in the radial direction, in the heights of the joint portions of the division coils can be prevented to some extent, but the distance from the outer periphery of the coil end to a motor frame becomes short. Accordingly, in particular, when the thickness of a back yoke is small, the distances between the joint portions of the division coils and the motor frame are also short. In this case, since the joint portions of the division coils are not covered with an insulating coating, there is consequently a problem in which an insulation distance cannot be sufficiently ensured between the joint portions of the division coils and the motor frame.

When a sufficient insulation distance cannot be ensured as described above, it is necessary to cover the joint portions of the division coils with an insulating paint or dispose a member formed from an insulating material such as resin, between the joint portions of the division coils and the motor frame. In any of these cases, the cost is increased.

The present invention has been made to solve the above-described problems, and an object of the present invention is to provide a stator for a rotary electric machine that can sufficiently ensure an insulation distance between joint portions of coil end portions and a motor frame while reducing the heights in an axial direction of joint portions of division coils.

Solution to the Problems

The present invention is directed to a stator for a rotary electric machine, the stator comprising an annular stator core having a plurality of slots for accommodating a stator coil, the stator coil accommodated in the slots being formed by connecting a plurality of separate coils for each phase, wherein the stator coil for each phase is formed by:
combining
a first division coil which is a coil with M or more turns (M is an integer equal to or greater than 2) and formed such that ($2 \times M$) conductor wires including a first conductor wire to a ($2 \times M$)th conductor wire are disposed in the slots in a radial direction of the stator core, and a first terminal end portion and a second terminal end portion are formed so as to be extended from the ($2 \times M - 1$)th conductor wire and the ($2 \times M$)th conductor wire to outside of the slots, respectively, a second division coil which is a coil with a number of winding turns decreased from that of the first division coil by 0.5 turns and disposed in the slots as a first conductor wire, a second conductor wire, and a ($2 \times M - 1$)th conductor wire in the radial direction of the stator core and in which a first terminal end portion is formed so as to be extended from the ($2 \times M - 1$)th conductor wire to outside of the slot, and a joint coil which is a coil with one turn and disposed in the slots as a ($2 \times M$)th conductor wire in the radial direction of the stator core and in which a first terminal end portion and a second terminal end portion are formed so as to be extended from both end portions of the (2×M)th conductor wire to outside of the slots, respectively; and selectively joining the first terminal end portion and the second terminal end portion of the first division coil, the first terminal end portion of the second division coil, and the first terminal end portion and the second terminal end portion of the joint coil.

Effect of the Invention

According to the present invention, joint portions of the respective separate coils do not overlap a coil end in the axial direction of the stator, and thus the height in the axial direction can be reduced.

BRIEF DESCRIPTION OF THE DRAWINGS

FIG. 3B is disposed in a stator core.

FIG. 8 is a schematic diagram showing a state where one joint coil shown in FIG. 7 is disposed in the stator core.

DESCRIPTION OF EMBODIMENTS

Embodiment 1

Figure 1:
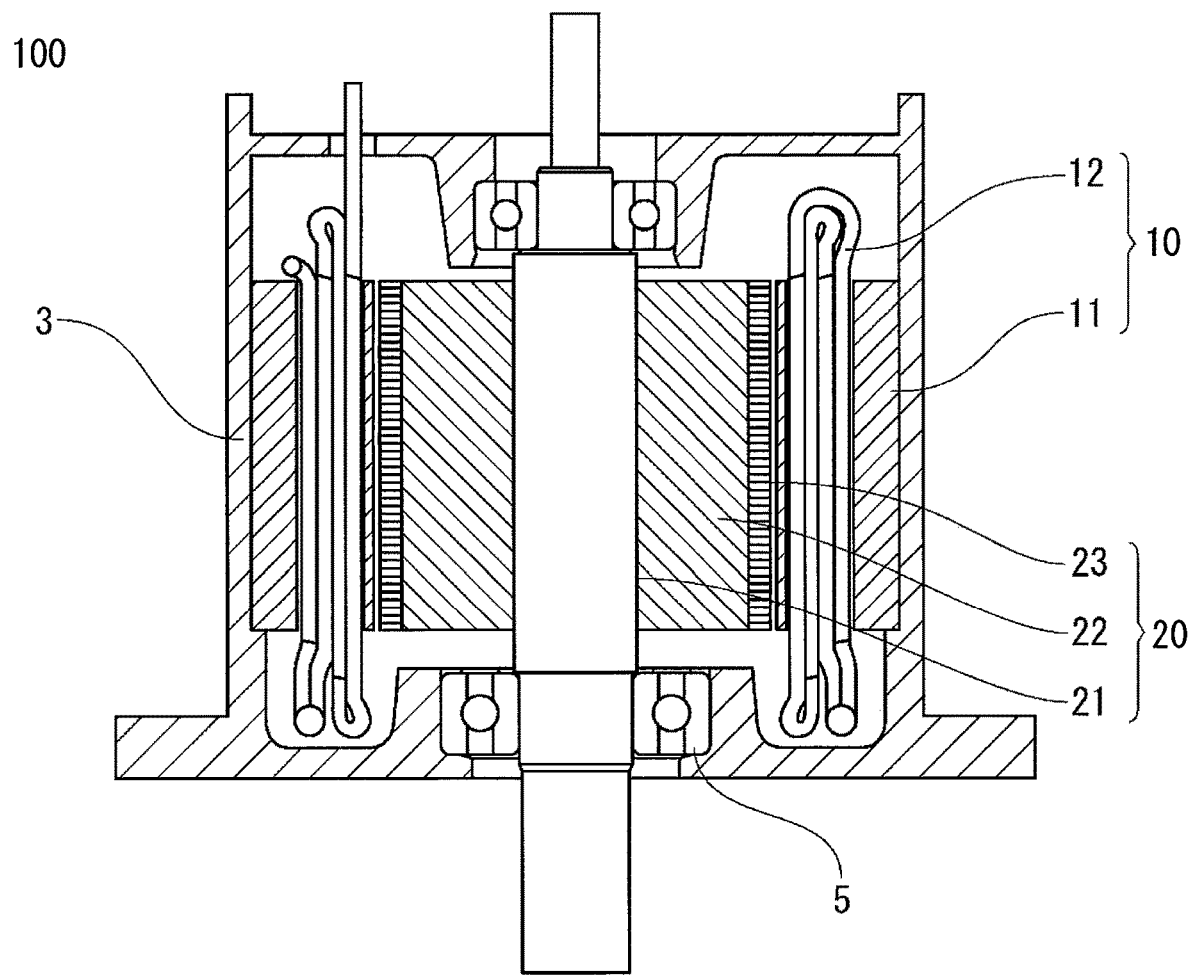
FIG. 1 is a cross-sectional schematic view of a rotary electric machine according to Embodiment 1 of the present invention, taken along the direction of a rotation shaft thereof.
Figure 2:
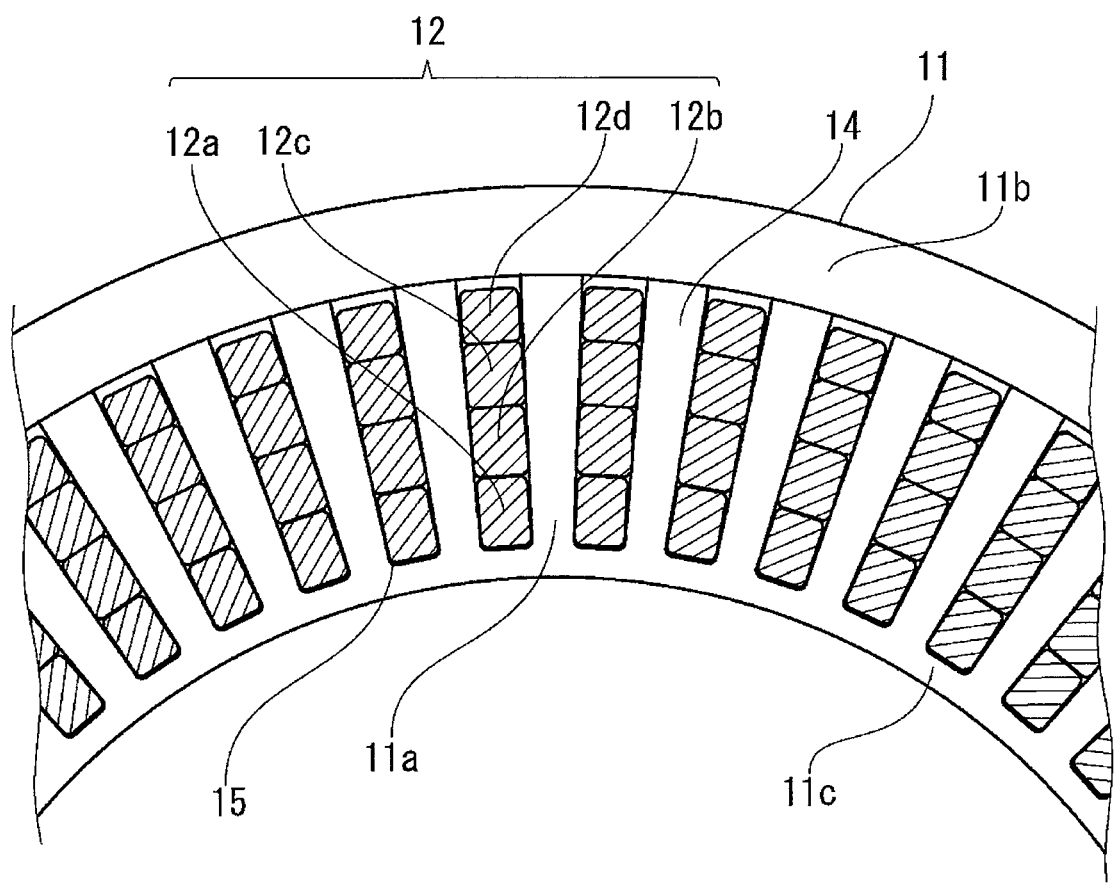
FIG. 2 is a cross-sectional view of a main part of a stator of the rotary electric machine according to Embodiment 1 of the present invention.

FIG. 1 is a cross-sectional schematic view of a rotary electric machine according to Embodiment 1 of the present invention, and FIG. 2 is a cross-sectional view of a main part of a stator of the rotary electric machine in FIG. 1.

A rotary electric machine 100 according to Embodiment 1 includes a stator 10, a rotor 20, and a substantially cylindrical motor frame (hereinafter, referred to merely as frame) 3 holding the stator 10 and the rotor 20 therein.

The rotor 20 includes a substantially cylindrical rotor core 22 fixed to a rotation shaft 21; and permanent magnets 23 mounted on the outer circumferential surface of the rotor core 22. Meanwhile, the stator 10 has a substantially cylindrical shape and includes a stator core 11 and a stator coil 12 wound on the stator core 11. In addition, the frame 3 mechanically holds the stator 10 and the rotor 20 and serves as a heat dissipation path for the stator 10, and a metal material such as iron or aluminum is generally used for the frame 3.

The stator 10 is fitted and fixed to the inner side of the frame 3 and is combined with the rotor 20 including the rotation shaft 21 rotatably supported by a bearing 5 with respect to the frame 3, whereby the rotary electric machine 100 is formed.

The stator core 11 is generally formed by stacking a plurality of thin sheets that are magnetic sheets formed from an iron-based material, and includes an annular back yoke 11b and an inner core 11a fitted inside the back yoke 11b.

The inner core 11a has a plurality of teeth 14 formed radially at regular intervals along the circumferential direction so as to project outward in the radial direction. In addition, the inner core 11a has an annular connection portion 11c which integrally connects adjacent portions of the inner circumferential side ends of the respective teeth 14. Slots 15 in which the stator coil 12 is accommodated are formed between the teeth 14 adjacent to each other in the circumferential direction.

The rotary electric machine according to Embodiment 1 has six phases, and the number of the slots 15 in the stator 10 is 48. Therefore, the angular pitch for one slot is 360/48=7.5°.

A distributed winding method in which winding is performed over a plurality of magnetic poles is adopted for the stator coil 12. When focusing on each slot 15, four conductor wires, that is, a first conductor wire 12a, a second conductor wire 12b, a third conductor wire 12c, and a fourth conductor wire 12d, are sequentially disposed in each slot 15 from the inner circumferential side to the outer circumferential side of the stator core 11 along the radial direction as shown in FIG. 2.

Moreover, the stator coil 12 for each phase is composed of a combination of six first division coils 30, two second division coils 40, and one joint coil 50. Thus, the specific configurations of the first division coils 30, the second division coils 40, and the joint coil 50 and the relationship with the respective conductor wires 12a to 12d disposed in the slot 15 will be described next.

(1) Configurations of First Division Coils 30

Figure 3A:
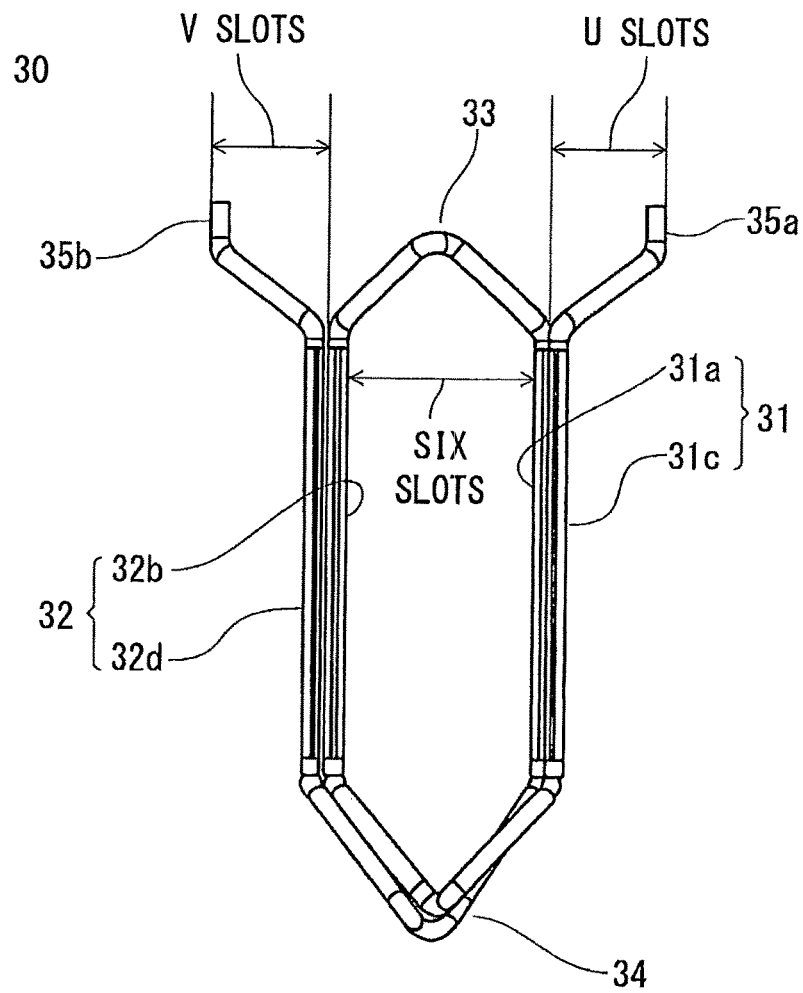
FIG. 3A is a front view of the first division coil for forming a stator coil of the stator of the rotary electric machine according to Embodiment 1 of the present invention.
Figure 3B:
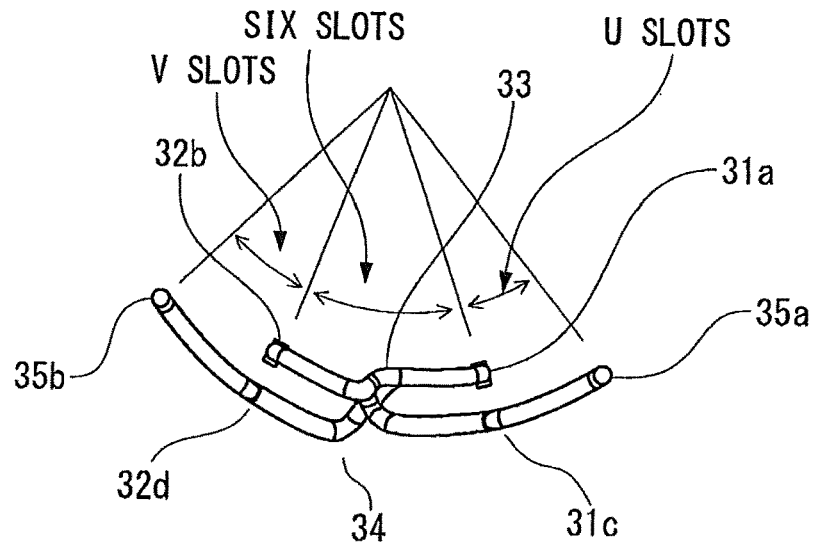
FIG. 3B is a plan view of the first division coil for forming a stator coil of the stator of the rotary electric machine according to Embodiment 1 of the present invention.

FIG. 3A and FIG. 3B shows the first division coil 30 having a basic shape for forming the stator coil 12, FIG. 3A is a front view, and FIG. 3B is a plan view.

Here, a coil for two turns (twice winding) is shown as the first division coil 30. The first division coil 30 is formed by shaping one conductor wire and includes a first terminal end portion 35a, a second terminal end portion 35b, and an intermediate portion wound in a hexagonal shape between these terminal end portions. As shown in FIG. 3B, the first division coil 30 is formed such that the entire shape thereof is curved in an arc shape along the circumferential direction of the stator core 11.

The intermediate portion having a hexagonal shape includes a first slot portion 31 and a second slot portion 32 which are to be inserted into the slots 15 of the stator core 11, and a first coil end portion 33 and a second coil end portion 34 which connect the first slot portion 31 and the second slot portion 32 at positions at the axially outer side of the stator core 11.

In this case, since the first division coil 30 is formed for two turns (twice winding), the first slot portion 31 is composed of two conductor wires 31a and 31c, and the second slot portion 32 is composed of two conductor wires 32b and 32d. In addition, the first coil end portion 33 is composed of one conductor wire, and the second coil end portion 34 is composed of two conductor wires.

The first terminal end portion 35a is present on an extension of the third conductor wire 31c, and the second terminal end portion 35b is present on an extension of the fourth conductor wire 32d. In addition, the first coil end portion 33, which is located at the first terminal end portion 35a and second terminal end portion 35b side, connects the first conductor wire 31a of the first slot portion 31 and the second conductor wire 32b of the second slot portion 32. Moreover, the second coil end portion 34, which is located at the side opposite to the first coil end portion 33 in the axial direction, connects the first conductor wire 31a and the fourth conductor wire 32d and connects the second conductor wire 32b and the third conductor wire 31c.

Regarding the arrangement relationship between the first to fourth conductor wires 31a, 31c, 32b, and 32d of the first slot portion 31 and the second slot portion 32 of the first division coil 30 shown in FIG. 3A and FIG. 3B, and the first to fourth conductor wires 12a to 12d from the inner circumferential side toward the outer circumferential side along the radial direction in the slot 15 shown in FIG. 2 described above, the first conductor wire 31a corresponds to the first conductor wire 12a, the third conductor wire 31c corresponds to the third conductor wire 12c, the second conductor wire 32b corresponds to the second conductor wire 12b, and the fourth conductor wire 32d corresponds to the fourth conductor wire 12d.

Here, the first slot portion 31 and the second slot portion 32 are formed such that an interval equivalent to six slots is maintained therebetween. That is, in Embodiment 1, since the number of the slots 15 is 48, the first slot portion 31 and the second slot portion 32 are assembled into the slots 15 at positions that are away from each other by six slots. In this case, the angular pitch for one slot is 360/48=7.5°, so that the angular pitch between the first slot portion 31 and the second slot portion 32 is 7.5×6=45°.

Furthermore, as shown in FIG. 3B, the first slot portion 31 and the first terminal end portion 35a are formed so as to be away from each other in the circumferential direction by U slots (angular pitch: 7.5°×U). Moreover, the second slot portion 32 and the second terminal end portion 35b are formed so as to be away from each other in the circumferential direction by V slots (angular pitch: 7.5°×V). In this case, U+V=6 which is equivalent to six slots (angular pitch:45°).

Next, the positional relationship between the respective conductor wires 31a, 31c, 32b, and 32d and the slots 15 in the case where the first division coil 30 is disposed in the slots 15 of the stator core 11 will be specifically described with reference to FIG. 4.

Figure 4:
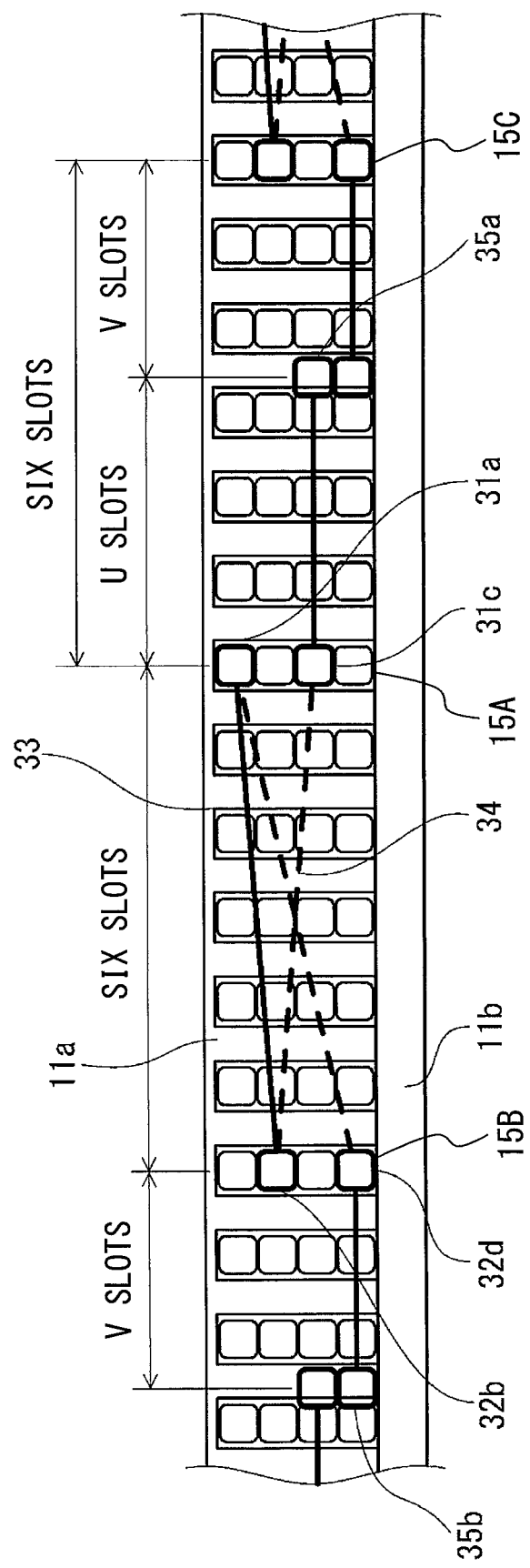
FIG. 4 is a schematic diagram showing a state where one first division coil shown in FIG. 3A

FIG. 4 is a schematic diagram showing a state where one first division coil 30 is disposed in the stator core 11. FIG. 4 shows a state where the stator core 11 which actually has a cylindrical shape is developed into a linear shape, and is a plan view when the side at which the first terminal end portion 35a and the second terminal end portion 35b project is viewed in the axial direction. In FIG. 4, the upper side corresponds to the inner circumferential side of the stator core 11, and the lower side corresponds to the outer circumferential side of the stator core 11.

The first conductor wire 31a and the third conductor wire 31c of the first division coil 30 are disposed in one slot 15 of the stator core 11 (for example, in a slot 15A in FIG. 4), and the second conductor wire 32b and the fourth conductor wire 32d of the same first division coil 30 are disposed in the slot 15 away from the arrangement location by six slots (for example, in a slot 15B in FIG. 4).

At the side at which the first terminal end portion 35a and the second terminal end portion 35b project, the first coil end portion 33 connects the first conductor wire 31a and the second conductor wire 32b to each other at the outer side of the stator core 11 in the axial direction.

In addition, at a location opposite to the first coil end portion 33 in the axial direction, the second coil end portion 34 connects the first conductor wire 31a and the fourth conductor wire 32d to each other and the second conductor wire 32b and the third conductor wire 31c to each other at the outer side of the stator core 11 in the axial direction as shown by broken lines in the drawing.

The first terminal end portion 35a is located at a location, outside the stator core 11, which is away from the position of the slot 15 in which the third conductor wire 31c is disposed (for example, the slot 15A in FIG. 4) by U slots. Similarly, the second terminal end portion 35b is located at a location, outside the stator core 11, which is away from the position of the slot 15 in which the fourth conductor wire 32d is disposed (for example, the slot 15B or a slot 15C in FIG. 4) by V slots in a direction opposite to that for the first terminal end portion 35a in the circumferential direction.

(2) Configurations of second division coils 40

Figure 5:
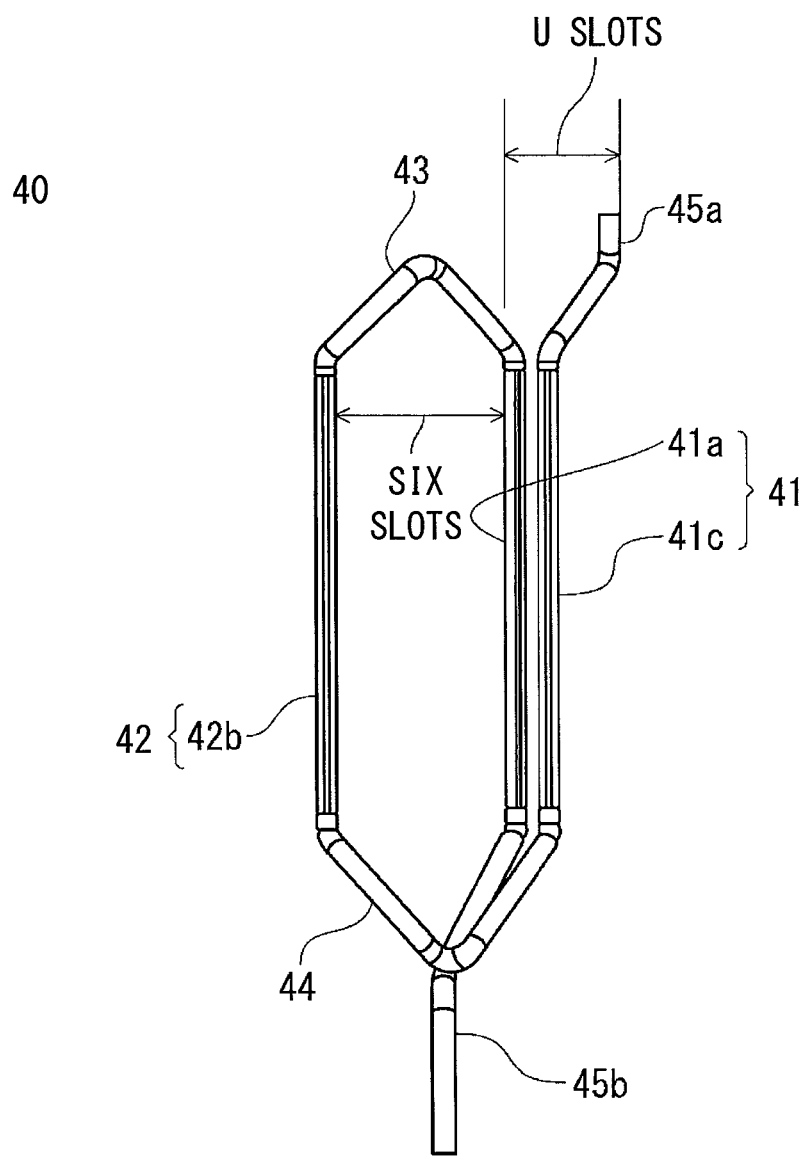
FIG. 5 is a front view showing a second division coil for forming the stator coil of the stator of the rotary electric machine according to Embodiment 1 of the present invention.

FIG. 5 is a front view showing the second division coil 40 for forming the stator coil 12.

When the configuration of the second division coil 40 is compared to the configuration of the first division coil 30 shown in FIG. 3A and FIG. 3B, the second division coil 40 is configured such that the fourth conductor wire 32d which is present in the first division coil 30 is omitted and the number of winding turns thereof is decreased from that of the first division coil 30 by 0.5 turns. Similar to the first division coil 30, the second division coil 40 is formed such that the entire shape thereof is curved in an arc shape along the circumferential direction of the stator core 11.

In other words, similar to the first division coil 30, the second division coil 40 has two slot portions, that is, a first slot portion 41 and a second slot portion 42. In the second division coil 40 as well, similar to the first division coil 30, the first slot portion 41 and the second slot portion 42 are formed such that an interval equivalent to six slots is maintained therebetween. However, in the second division coil 40, the first slot portion 41 is composed of two conductor wires, that is, a first conductor wire 41a and a third conductor wire 41c, but the second slot portion 42 is composed of only one second conductor wire 42b, since no fourth conductor wire is present.

In addition, the second division coil 40 has a first terminal end portion 45a and a second terminal end portion 45b, the first terminal end portion 45a is present on an extension of the third conductor wire 41c, and the second terminal end portion 45b is present on an extension of the first conductor wire 41a. Thus, the second terminal end portion 45b projects in a direction opposite to that of the first terminal end portion 45a.

Similar to the first division coil 30, a first coil end portion 43 which is located at the first terminal end portion 45a side connects the first conductor wire 41a and the second conductor wire 42b. Meanwhile, unlike the first division coil 30, a second coil end portion 44 which is located at the side opposite to the first coil end portion 43 connects the second conductor wire 42b and the third conductor wire 41c only with one wire.

The first slot portion 41 and the second slot portion 42 are formed such that an interval equivalent to six slots (angular pitch: 45°) is maintained therebetween. Furthermore, the first slot portion 41 and the first terminal end portion 45a are formed so as to be away from each other by U slots (angular pitch: 7.5°×U) in the circumferential direction.

Here, regarding the arrangement relationship between the respective conductor wires 41a, 41c, and 42b of the first slot portion 41 and the second slot portion 42 of the second division coil 40 shown in FIG. 5 and the first to third conductor wires 12a to 12c from the inner circumferential side toward the outer circumferential side along the radial direction in the slot 15 shown in FIG. 2 described above, the first conductor wire 41a corresponds to the first conductor wire 12a, the third conductor wire 41c corresponds to the third conductor wire 12c, and the second conductor wire 42b corresponds to the second conductor wire 12b.

Next, the positional relationship between the respective conductor wires 41a, 41c, and 42b and the slots 15 in the case where the second division coil 40 is disposed in the slots 15 of the stator core 11 will be specifically described with reference to FIG. 6.

Figure 6:
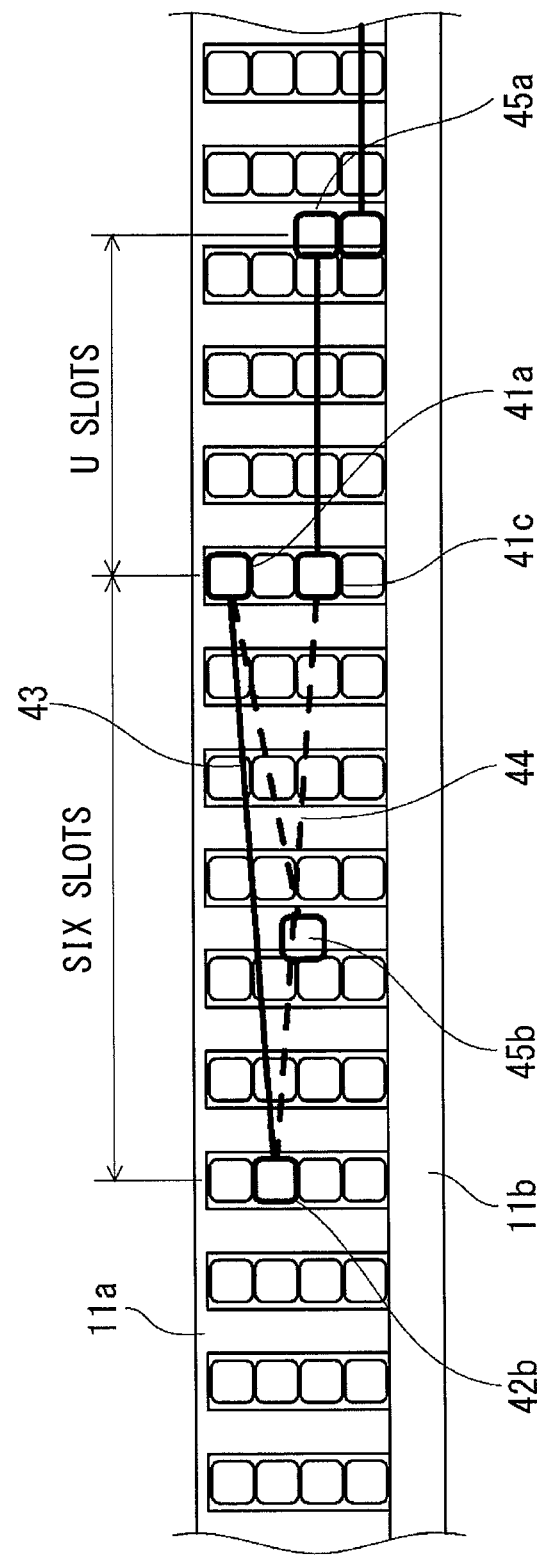
FIG. 6 is a schematic diagram showing a state where one second division coil shown in FIG. 5 is disposed in the stator core.

FIG. 6 is a schematic diagram showing a state where one second division coil 40 is disposed in the stator core 11. FIG. 6 shows a state where the stator core 11 which actually has a cylindrical shape is developed into a linear shape, and is a plan view when the side at which the first terminal end portion 45a projects is viewed in the axial direction. In FIG. 6, the upper side corresponds to the inner circumferential side of the stator core 11, and the lower side corresponds to the outer circumferential side of the stator core 11.

The first conductor wire 41a and the third conductor wire 41c of the first slot portion 41 and the second conductor wire 42b of the second slot portion 42 are located so as to be away from each other by six slots (angular pitch:45°).

At the side at which the first terminal end portion 45a projects, the first coil end portion 43 connects the first conductor wire 41a and the second conductor wire 42b to each other at the outer side of the stator core 11 in the axial direction.

At a location opposite to the first coil end portion 43 in the axial direction, the second coil end portion 44 connects the second conductor wire 42b and the third conductor wire 41c to each other at the outer side of the stator core 11 in the axial direction as shown by a broken line in the drawing.

In addition, the first terminal end portion 45a is located at a location, outside the stator core 11, which is away from the position of the slot 15 in which the third conductor wire 41c is disposed, by U slots. Moreover, the second terminal end portion 45b is projected as a connection terminal of the stator coil 12 for one phase at the axially outer side of the stator core 11 on the extension of the first conductor wire 41a at the second coil end portion 44 side.

(3) Configuration of Joint Coil

Figure 7:
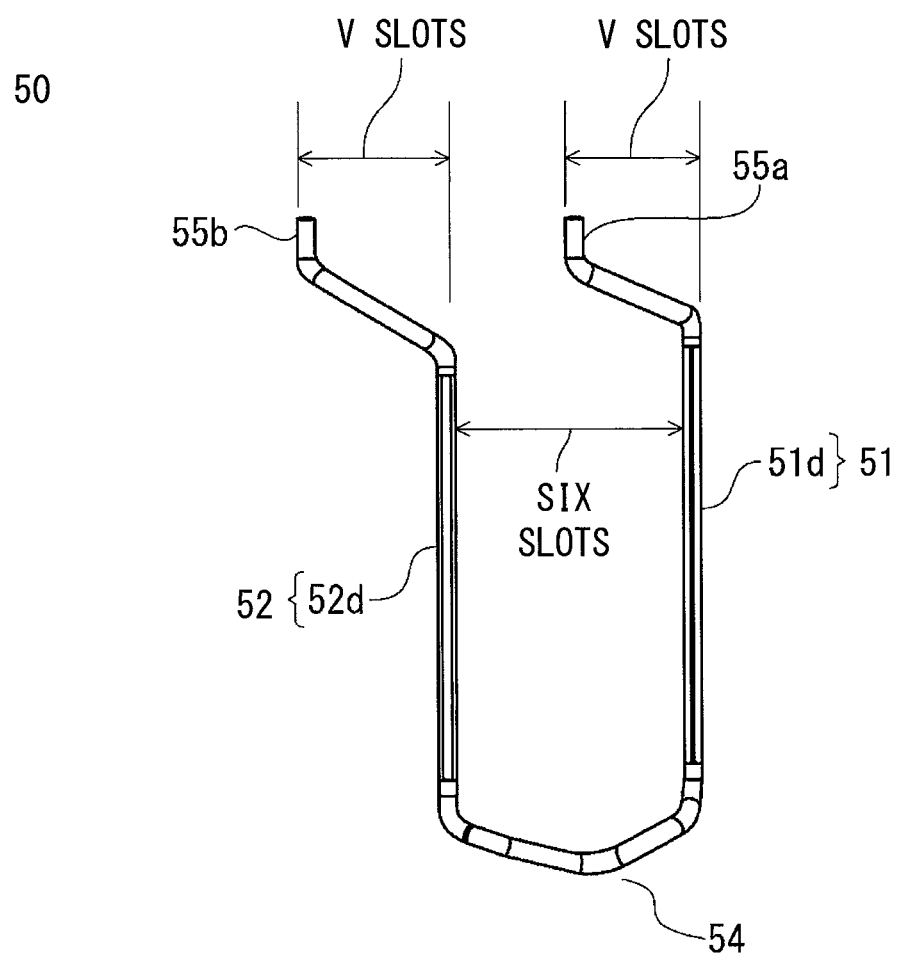
FIG. 7 is a front view of a joint coil for forming the stator coil of the stator of the rotary electric machine according to Embodiment 1 of the present invention.

FIG. 7 is a front view showing one joint coil 50 which is included in the stator coil 12 for each phase.

The joint coil 50 is a coil with one turn and has two slot portions, that is, a first slot portion 51 and a second slot portion 52. The first slot portion 51 and the second slot portion 52 are each composed of one fourth conductor wire 51d or 52d. These fourth conductor wires 51d and 52d are connected to each other by a second coil end portion 54. In this case as well, the joint coil 50 is formed such that the entire shape thereof is curved in an arc shape along the circumferential direction of the stator core 11.

Similar to the cases of the first division coil 30 and the second division coil 40, the first slot portion 51 and the second slot portion 52 are formed such that an interval equivalent to six slots (angular pitch: 45°) is maintained therebetween.

A first terminal end portion 55a which is present on an extension of the fourth conductor wire 51d is away from the fourth conductor wire 51d in the circumferential direction by V slots (angular pitch: 7.5°×V). Similarly, a second terminal end portion 55b which is present on an extension of the fourth conductor wire 52d is away from the fourth conductor wire 52d in the circumferential direction by V slots (angular pitch: 7.5°×V).

Regarding the arrangement relationship with the respective conductor wires 12a to 12d in the slot 15 shown in FIG. 2 described above, the fourth conductor wires 51d and 52d correspond to the fourth conductor wire 12d located at the outermost circumferential side in the radial direction.

Next, the positional relationship between the fourth conductor wires 51d and 52d and the slots 15 in the case where the joint coil 50 is disposed in the slots 15 of the stator core 11 will be specifically described with reference to FIG. 8.

FIG. 8 is a schematic diagram showing a state where one joint coil 50 is disposed in the stator core 11. FIG. 8 shows a state where the stator core 11 which actually has a cylindrical shape is developed into a linear shape, and is a plan view when the side at which the first terminal end portion 55a and the second terminal end portion 55b project is viewed in the axial direction. In FIG. 8, the upper side corresponds to the inner circumferential side of the stator core 11, and the lower side corresponds to the outer circumferential side of the stator core 11.

The fourth conductor wire 51d of the first slot portion 51 and the fourth conductor wire 52d of the second slot portion 52 which are disposed in the slots 15 are located so as to be away from each other by six slots. In addition, at the side opposite to the side at which the first terminal end portion 55a and the second terminal end portion 55b project, the second coil end portion 54 which connects two wires, that is, the fourth conductor wire 51d and the fourth conductor wire 52d, is extended on the back yoke 11b of the stator core 11 and connects the fourth conductor wire 51d and the fourth conductor wire 52d to each other at the outer side of the stator core 11 in the axial direction as shown by a broken line in the drawing. The second coil end portion 54 does not protrude outward in the radial direction from the back yoke 11b.

The first terminal end portion 55a is located at a location, outside the stator core 11, which is away from the position of the slot 15 in which the fourth conductor wire 51d is disposed, by V slots. Similarly, the second terminal end portion 55b is located at a location, outside the stator core 11, which is away from the position of the slot 15 in which the fourth conductor wire 52d is disposed, by V slots in the same direction as that for the first terminal end portion 55a in the circumferential direction.

(4) Configuration of Stator Coil for One Phase

Figure 9A:
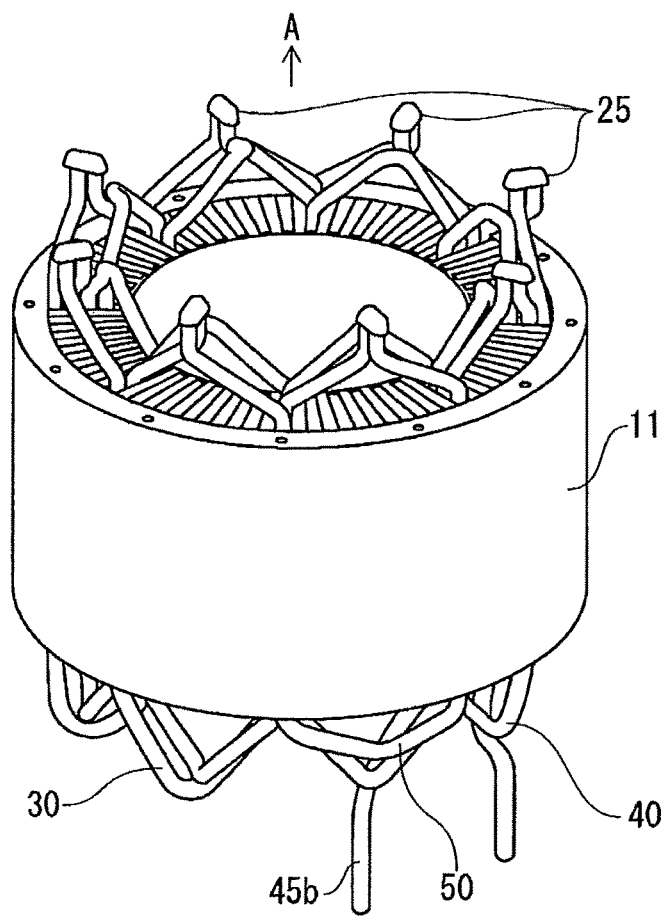
FIG. 9A shows a perspective view illustrating a stator coil for one phase of the stator according to Embodiment 1 of the present invention.
Figure 9B:
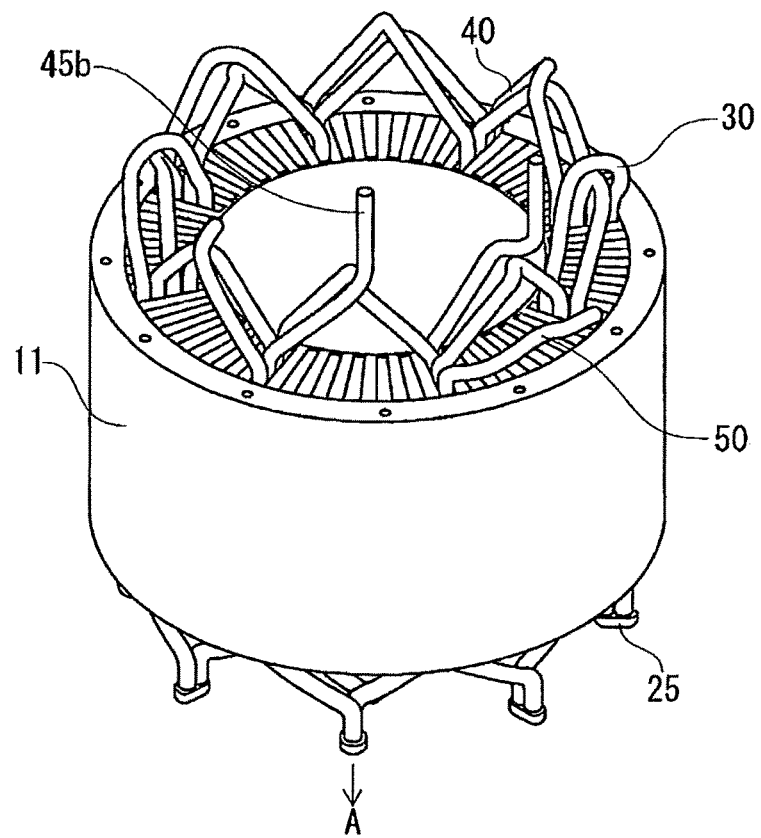
FIG. 9B shows a perspective view illustrating a stator coil for one phase of the stator according to Embodiment 1 of the present invention.
Figure 10:
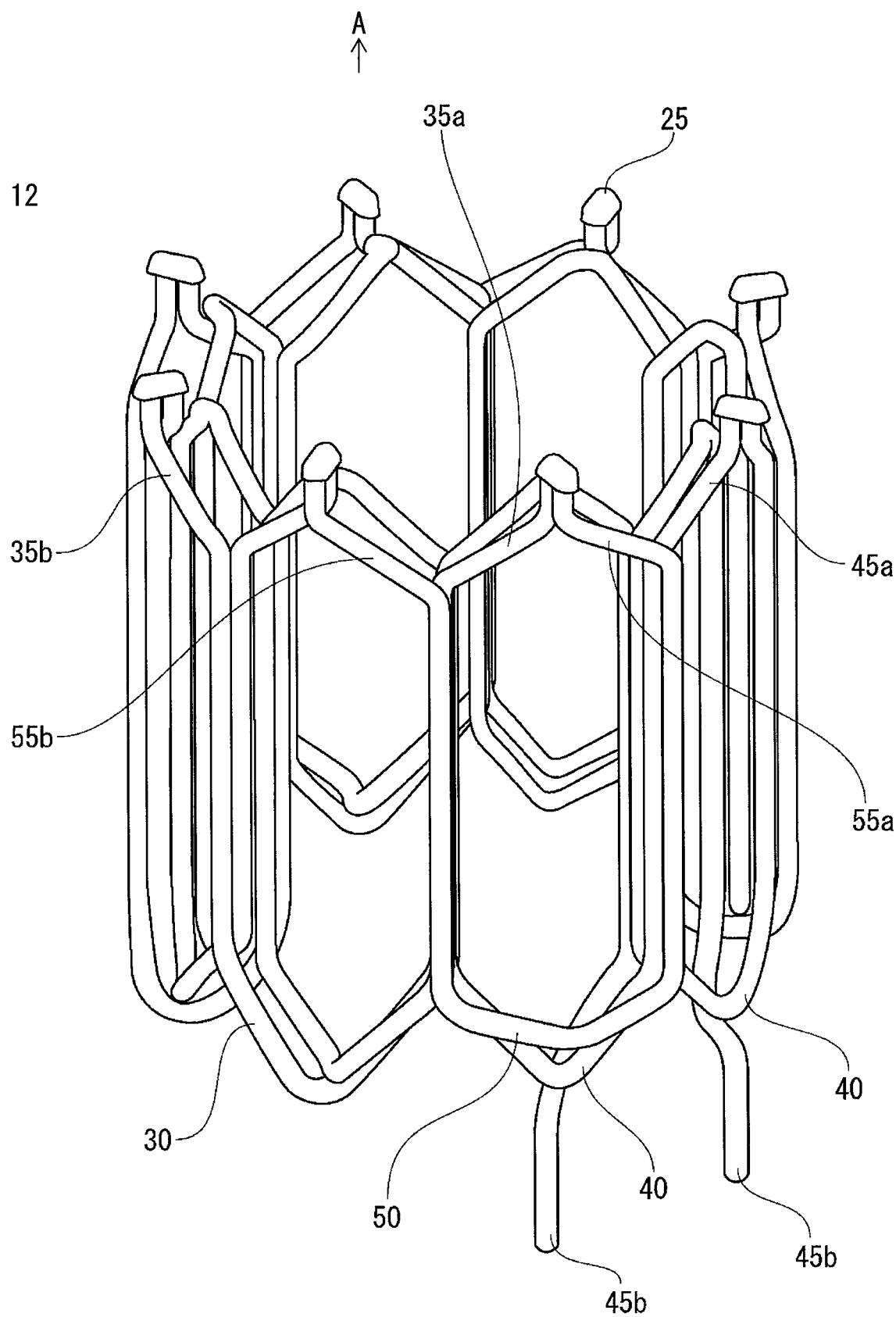
FIG. 10 is a perspective view showing the stator coil for one phase, wherein the stator core of the stator in FIG. 9A is not shown.

FIG. 9A and FIG. 9B shows perspective views in which a stator coil only for one phase is shown and stator coils for the other phases are not shown. FIG. 9A is a perspective view as viewed with the terminal end portion side of the first division coil 30, the second division coil 40, and the joint coil 50 (an A side) as the upper side. FIG. 9B is a perspective view as viewed with the side at which the terminal end portions of the first division coil 30, the second division coil 40, and the joint coil 50 are disposed (the A side) as the lower side. In addition, FIG. 10 is a perspective view in the case where only the stator coil for one phase is shown and the stator coils for the other phases and the stator core are not shown in the state of FIG. 9A.

When the number of slots of the stator 10 is N and the number of phases of the stator coil 12 is P, the number of slots per phase is N/P (N can be divided by 2P). In this case, the stator coil 12 for one phase includes {(N/P)−2} first division coils 30, two second division coils 40, and one joint coil 50.

As a specific example, since the description has been given in Embodiment 1 on the assumption that the number of slots is 48 and the number of phases is six, the stator coil 12 for one phase includes first division coils 30 the number of which is (N/P)−2=(48/6)−2=6, two second division coils 40, and one joint coil 50.

In this case, the six first division coils 30 which are coils with two turns are sequentially disposed such that the first slot portions 31 and the second slot portions 32 thereof are located at intervals of six slots along the circumferential direction of the stator core 11, and subsequently the two second division coils 40 which are coils with 1.5 turns are disposed such that the first slot portions 41 and the second slot portions 42 are located at intervals of six slots along the circumferential direction.

Accordingly, the first conductor wire 12a to the third conductor wire 12c in FIG. 2 are disposed in each of the slots 15 at two locations in which the second slot portions 42 of the second division coils 40 are disposed, and the first conductor wire 12a to the fourth conductor wire 12d in FIG. 2 are disposed in each of the other slots 15. Furthermore, the fourth conductor wires 51d and 52d of the joint coil 50 are disposed in the slots 15 in which the second slot portions 42, that is, the second conductor wires 42b, of the second division coils 40 are disposed, respectively. Accordingly, four wires, that is, the first conductor wire 12a to the fourth conductor wire 12d are disposed in each slot 15 as shown in FIG. 2.

Unlike the first division coils 30 and the second division coils 40, in the joint coil 50, the second coil end portion 54 is disposed on the back yoke 11b by being bent outward in the radial direction from the first and second slot portions 51 and 52 at the axially outer side of the stator core 11.

The second coil end portion 34 of each first division coil 30 and the second coil end portion 44 of each second division coil 40 are shaped to be connected to the third conductor wires 31c and 41c, respectively, but the second coil end portion 54 of the joint coil 50 is shaped to connect the fourth conductor wires 51d and 52d, which are located outward of the third conductor wires 31c and 41c, to each other, so that the shape of the second coil end portion 54 of the joint coil 50 cannot be the same as the shape of the second coil end portion 34 of the first division coil 30 or the shape of the second coil end portion 44 of the second division coil 40.

In other words, it is made possible to dispose the second coil end portion 34 of the first division coil 30 and the second coil end portion 44 of the second division coil 40 side by side in the circumferential direction by forming the second coil end portion 34 and the second coil end portion 44 in the same shape, but the second coil end portion 54 of the joint coil 50 cannot be located in a mixed manner with the second coil end portion 34 of the first division coil 30 and the second coil end portion 44 of the second division coil 40 since the shape of the second coil end portion 54 is different from those of the second coil end portion 34 and the second coil end portion 44.

Therefore, the second coil end portion 54 of the joint coil 50 is disposed on the back yoke 11b, thereby avoiding interference with the other second coil end portions 34 and 44. The second coil end portion 54 of the joint coil 50 is extended on the back yoke 11b of the stator core 11 but, as described above, does not protrude outward in the radial direction from the back yoke 11b.

All the terminal end portions of the first division coils 30, the second division coils 40, and the joint coil 50, except for the second terminal end portions 45b of the second division coils 40, are disposed at one side in the axial direction of the stator 10 (at the A side), and thus two terminal end portions adjacent to each other in the circumferential direction are joined together, whereby the stator coil 12 for one phase is formed. In addition, the second terminal end portions 45b of the two second division coils 40 are both terminal end portions of the stator coil 12 for one phase.

(5) Regarding Joining of Terminal End Portions

Next, regarding the stator coil 12 for one phase, a manner in which the respective terminal end portions of the first division coils 30, the second division coils 40, and the joint coil 50 at the one side in the axial direction of the stator 10 (the A side in FIG. 9A, FIG. 9B and FIG. 10) are joined, will be described.

The respective terminal end portions of the first division coils 30, the second division coils 40, and the joint coil 50 which have been assembled to the stator core 11 are joined together in series, whereby a stator coil for one phase is formed. In this case, all the joint portions of the respective terminal end portions fall within the ranges of positions where the respective terminal end portions are formed, along the circumferential direction of the stator core 11, and do not further expand in the radial direction from the inner core 11a or the back yoke 11b.

As shown in FIG. 10, the terminal end portions joined to each other are present on the extensions of the third conductor wires 31c and 41c or the fourth conductor wires 32d, 51d, and 52d of the first division coils 30, the second division coils 40, and the joint coil 50, and the terminal end portions 35a and 45a which are present on the extensions of the third conductor wires 31c and 41c, respectively, are joined to the terminal end portions 35b, 55a, and 55b which are present on the extensions of the fourth conductor wires 32d, 51d, and 52d assembled into the slots 15 which are away from each other by six slots.

Specifically, the first terminal end portion 35a of one first division coil 30 is connected to the second terminal end portion 35b of another first division coil 30 adjacent thereto. In addition, at the location where each second division coil 40 is located, the second terminal end portion 35b of the first division coil 30 is joined to the first terminal end portion 45a of the second division coil 40. Furthermore, at the location where the joint coil 50 is present, the first terminal end portion 55a of the joint coil 50 and the first terminal end portion 35a of the first division coil 30 are joined, and the second terminal end portion 55b of the joint coil 50 and the first terminal end portion 35a of the first division coil 30 are joined.

A method such as welding or soldering is used for joining two terminal end portions adjacent to each other, and thus it is necessary to make two terminal end portions, which are to be joined to each other, close to a position where the terminal end portions are brought into contact with each other. Thus, the two terminal end portions adjacent to each other are bent from slot portions in opposite directions so as to have lengths equivalent to U slots (angular pitch: 7.5°×U) and V slots (angular pitch: 7.5°×V), respectively, in the circumferential direction, and thus have a length equivalent to U+V=6 slots (angular pitch:45°).

The tips of the two terminal end portions which are adjacent to each other and bent along the circumferential direction of the stator core 11 as described above are joined together by means of welding or soldering. At the one end side in the axial direction of the stator 10 (the A side), joint portions 25 are formed at the tips of the respective terminal end portions. In a state where the stator coil for all the phases has been assembled, joint portions 25 the number of which is equal to the number of slots are located on a circumference (see FIG. 12A).

By disposing the first division coils 30, the second division coils 40, and the joint coil 50 and connecting the terminal end portions thereof to each other as described above, the first division coils 30, the second division coils 40, and the joint coil 50 can be connected in series. In this case, the locations where the respective terminal end portions 35a, 35b, 45a, 55a, and 55b are joined do not overlap the first coil end portions 33 and 43 of the first division coils 30, the second division coils 40, and the joint coil 50, and thus the height in the axial direction of the stator 10 is reduced to be low.

In Embodiment 1, since the number of phases is six, the number of slots is 48, and four conductor wires are disposed in each slot 15 along the radial direction. As a result of connection thereof, conductor wires the number of which is (48/6)×4=32 are connected in series such that current conduction directions in adjacent slots are opposite to each other.

Figure 11:
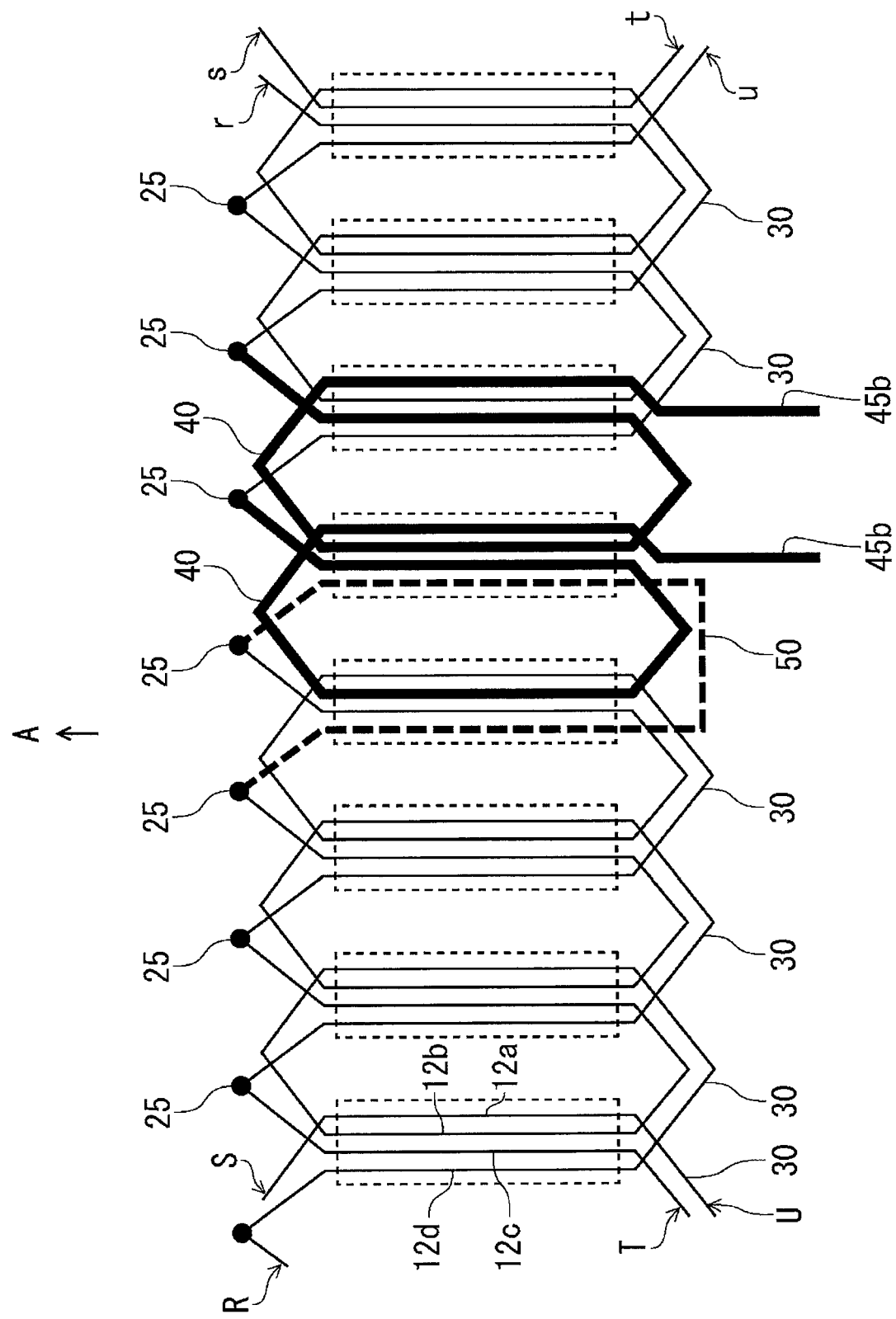
FIG. 11 is a diagram schematically illustrating a connection state of the stator coil for one phase according to Embodiment 1 of the present invention.

FIG. 11 is a diagram schematically illustrating a connection state of nine coils for forming the stator coil 12 for one phase, that is, the six first division coils 30, the two second division coils 40, and the one joint coil 50. FIG. 11 is a diagram showing a state where the stator coil 12 which is disposed in a cylindrical shape is developed into a linear shape, and coils R, S, T, and U at the left side in FIG. 11 are connected to coils r, s, t, and u at the right side in FIG. 11, respectively. In FIG. 11, rectangles shown by thin broken lines respectively represent the slots 15 that are away from each other by six slots, and the four conductor wires 12a to 12d are disposed in each slot 15. In FIG. 11, the four conductor wires 12a to 12d are shown in the order of the first conductor wire 12a, the second conductor wire 12b, the third conductor wire 12c, and the fourth conductor wire 12d from the right edge.

As described above, in the present embodiment, the stator coil 12 for one phase includes the six first division coils 30, the two second division coils 40, and the one joint coil 50. In FIG. 11, the first division coils 30 are shown by thin solid lines, the second division coils 40 are shown by thick solid lines, and the joint coil 50 is shown by a thick broken line.

The six first division coils 30 are continuously disposed, and then the one joint coil 50 and the two second division coils 40 are disposed. In FIG. 11, one of the first division coils 30 is shown so as to be divided into left and right portions in the drawing.

(6) Configuration of Stator Coil for all Phases

The stator coil 12 for one phase is formed by combining the six first division coils 30, the two second division coils 40, and the one joint coil 50, and the stator coil 12 for all the phases is formed by providing the stator coil 12 for one phase, for six phases.

Figure 12A:
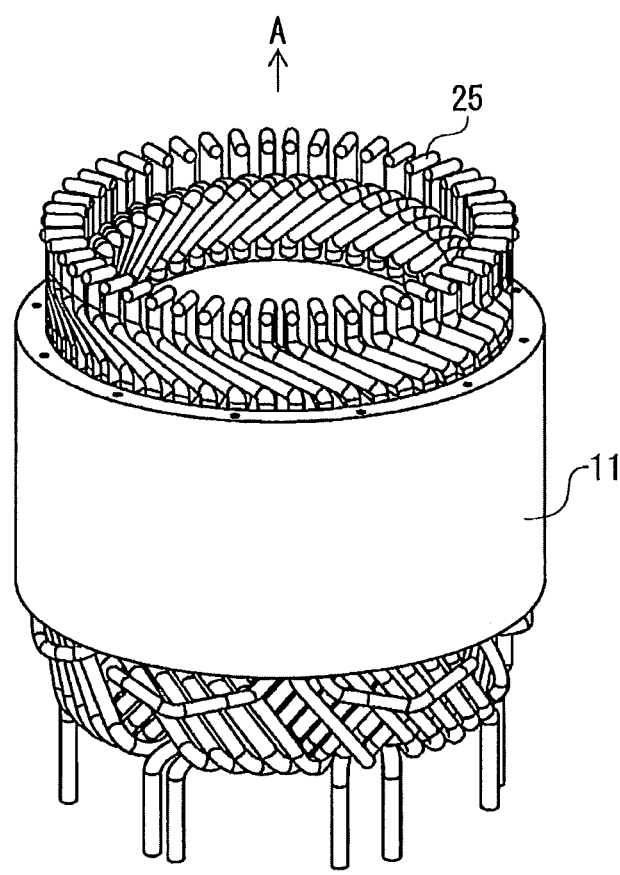
FIG. 12A shows a perspective view of the stator according to Embodiment 1 of the present invention.
Figure 12B:
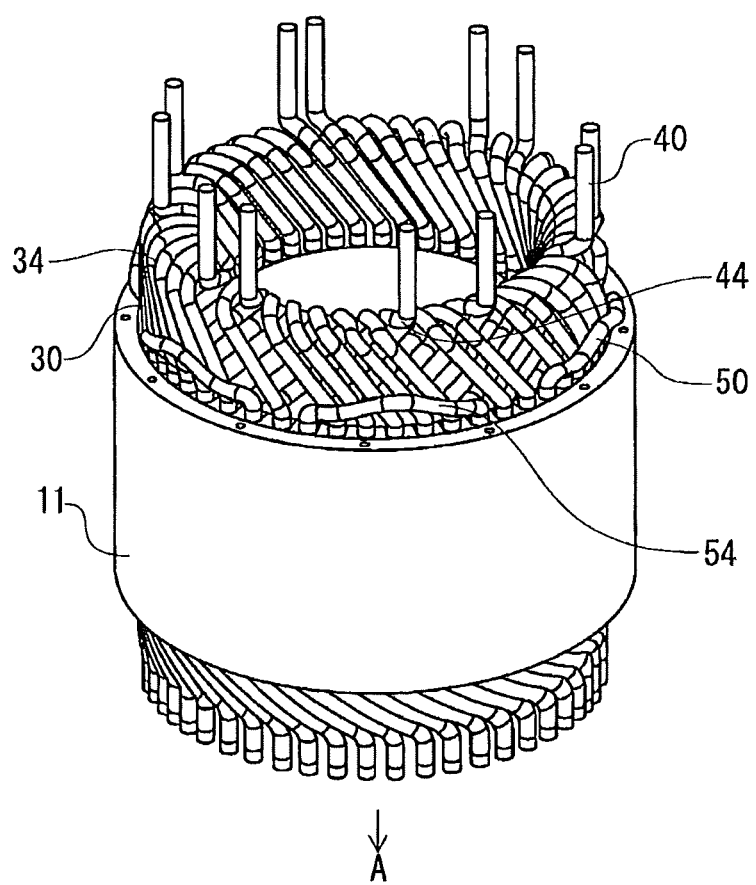
FIG. 12B shows a perspective view of the stator according to Embodiment 1 of the present invention.

FIG. 12A and FIG. 12B shows perspective views in the case where the stator coil 12 for all the phases is assembled and the stator 10 is formed. FIG. 12A is a perspective view as viewed with the side at which the respective terminal end portions of the first division coils 30, the second division coils 40, and the joint coil 50 are disposed (the A side) as the upper side. FIG. 12B is a perspective view as viewed with the side at which the respective terminal end portions of the first division coils 30, the second division coils 40, and the joint coil 50 are disposed (the A side) as the lower side.

The first terminal end portion 35a and the second terminal end portion 35b of each first division coil 30, the first terminal end portion 45a of each second division coil 40, and the first terminal end portion 55a and the second terminal end portion 55b of the joint coil 50 are all disposed at the one side in the axial direction of the stator 10 (the A side). In this case, as described above, the locations where the respective terminal end portions 35a, 35b, 45a, 55a, and 55b are joined do not overlap the first coil end portion 33 of each first division coil 30 and the first coil end portion 43 of each second division coil 40, and thus the height in the axial direction of the stator 10 can be reduced. In addition, at the side opposite to the one side in the axial direction of the stator 10 (the A side), the second coil end portion 34 of each first division coil 30, the second coil end portion 54 of the joint coil 50, and the second coil end portion 44 of each second division coil 40 are disposed side by side, and the second terminal end portions 45b of the second division coils 40 project outward in the axial direction from the gaps therebetween.

In Embodiment 1, the second coil end portion 54 of the joint coil 50 is disposed on the back yoke 11b at the outer circumferential side of the slots 15. At this time, when the width in the radial direction of the back yoke 11b has no margin, there is a possible case where a sufficient distance cannot be ensured between the frame 3 and the joint coil 50. In addition, when the stator 10 is assembled to the frame 3 by a method such as press fitting, there is a possible case where a space for supporting the stator core 11 is not sufficient.

However, only the second coil end portion 54 of the joint coil 50 is disposed on the back yoke 11b, and in this case, the second coil end portion 54 does not protrude outward in the radial direction from the back yoke 11b of the stator core 11 and has an insulating coating, and thus sufficient insulation from the frame 3 can be ensured.

In addition, since the rotor 20 is disposed at the inner circumferential side of the stator 10, the respective coil end portions 33, 34, 43, 44, and 54 of the stator coil 12 which includes the first division coils 30, the second division coils 40, and the joint coil 50 for forming the stator 10 have to be located outward of the outer circumference of the rotor 20 in the radial direction. In the case where the respective coil end portions 33, 34, 43, 44, and 54 are located inward of the outer circumference of the rotor 20 in the radial direction, it is impossible to assemble the rotor 20. In the case of Embodiment 1, since the respective coil end portions 33, 34, 43, 44, and 54 at the side where the terminal end portions are joined to each other (the A side in FIG. 12A) do not protrude inward in the radial direction from the outer circumference of the rotor 20, and thus there is no problem for assembling the rotor 20.

Expanded Examples of Embodiment 1

In Embodiment 1, the stator 10 of the rotary electric machine has six phases and 48 slots, and four wires, that is, the first to fourth conductor wires 12a to 12d, are disposed in each slot 15 as shown in FIG. 2. However, the same connection method can be adopted even when the number of phases or the number of slots of the stator is different.

For example, in the case with five phases, not six phases, the interval at which the slot portions of the respective division coils are disposed is equivalent to five slots, and the respective bent terminal end portions have a length equivalent to U+V=5 slots. In addition, in the case where the number of slots is not 48 but 60, the number of first division coils 30 among the division coils for forming the stator coil 12 is increased. That is, in the case with 60 slots, the stator coil for one phase includes eight first division coils 30, two second division coils 40, and one joint coil 50.

In Embodiment 1, when the number of turns is M, a coil having M=2 is used as each first division coil 30, but the number of turns M is not limited thereto, and can be generalized as follows.

Specifically, each first division coil 30 may be a coil with M or more turns (M is an integer equal to or greater than 2). In this case, the first division coil 30 is formed such that (2×M) conductor wires including a first conductor wire to a (2×M)th conductor wire are disposed in the slot 15 in the radial direction of the stator core 11, and the first terminal end portion 35a and the second terminal end portion 35b are formed so as to be extended from the (2×M−1)th conductor wire and the (2×M)th conductor wire to the outside of the slot 15, respectively. In addition, to be fitted to the configuration of the first division coil 30, each second division coil 40 is a coil having a number of winding turns decreased from that of the first division coil 30 by 0.5 turns, and is formed such that the second division coil 40 is disposed in the slot 15 as a first conductor wire, a second conductor wire, and a (2×M−1)th conductor wire in the radial direction of the stator core 11, and the first terminal end portion 45a is formed so as to be extended from the (2×M−1)th conductor wire to the outside of the slot 15. Furthermore, the joint coil 50 is formed such that the joint coil 50 is disposed in the slot 15 as a (2×M)th conductor wire in the radial direction of the stator core 11, and the first terminal end portion 55a and the second terminal end portion 55b are formed so as to be extended from both end portions of the (2×M)th conductor wire to the outside of the slot 15, respectively.

The present invention is not limited to the configuration of Embodiment 1 described above, and the configuration of Embodiment 1 may be partially modified or partially omitted without deviating from the scope of the present invention.

The invention claimed is:

1. A stator for a rotary electric machine, the stator comprising an annular stator core having a plurality of slots for accommodating a stator coil, the stator coil accommodated in the slots being formed by connecting a plurality of separate coils for each phase, wherein
the stator coil for each phase is formed by: combining
a first division coil which is a coil with M or more turns (M is an integer equal to or greater than 2) and formed such that (2×M) conductor wires including a first conductor wire to a (2×M)th conductor wire are disposed in the slots in a radial direction of the stator core, and a first terminal end portion and a second terminal end portion are formed so as to be extended from the (2×M−1)th conductor wire and the (2×M)th conductor wire to outside of the slots, respectively,
a second division coil which is a coil with a number of winding turns decreased from that of the first division coil by 0.5 turns and disposed in the slots as a first conductor wire, a second conductor wire, and a (2×M−1)th conductor wire in the radial direction of the stator core and in which a first terminal end portion is formed so as to be extended from the (2×M−1)th conductor wire to outside of the slot, and
a joint coil which is a coil with one turn and disposed in the slots as a (2×M)th conductor wire in the radial direction of the stator core and in which a first terminal end portion and a second terminal end portion are formed so as to be extended from both end portions of the (2×M)th conductor wire to outside of the slots, respectively; and
selectively joining the first terminal end portion and the second terminal end portion of the first division coil, the first terminal end portion of the second division coil, and the first terminal end portion and the second terminal end portion of the joint coil.

2. The stator for a rotary electric machine according to claim 1, wherein, when the number of phases is P and the number of slots is N, the stator coil for one phase includes the {(N/P)-2} first division coils, the two second division coils, and the one joint coil.

3. The stator for a rotary electric machine according to claim 1, wherein the first conductor wire is disposed at an innermost circumferential position in the slot of the stator core.

4. The stator for a rotary electric machine according to claim 2, wherein the first conductor wire is disposed at an innermost circumferential position in the slot of the stator core.

* * * * *